United States Patent [19]
Dickerson

[11] Patent Number: 5,788,841
[45] Date of Patent: *Aug. 4, 1998

[54] METHOD FOR IMPROVING WASTEWATER TREATMENT

[76] Inventor: J. Rodney Dickerson, P.O. Box 827, Scott, La. 70583

[*] Notice: The term of this patent shall not extend beyond the expiration date of Pat. No. 5,578,211.

[21] Appl. No.: 753,408

[22] Filed: Nov. 25, 1996

Related U.S. Application Data

[63] Continuation-in-part of Ser. No. 587,554, Jan. 17, 1996, Pat. No. 5,578,211.

[51] Int. Cl.$^6$ .................... C02F 3/30; C02F 3/34
[52] U.S. Cl. .................... 210/610; 210/620; 210/630; 210/631; 210/920
[58] Field of Search .................... 210/601, 610, 210/611, 614, 615, 620, 630, 631, 747, 760, 170, 920

[56] References Cited

U.S. PATENT DOCUMENTS

| | | | |
|---|---|---|---|
| 4,042,494 | 8/1977 | Stoyer | 210/170 |
| 4,115,258 | 9/1978 | Smith et al. | 210/614 |
| 4,469,596 | 9/1984 | Kantor | 210/170 |
| 4,925,564 | 5/1990 | Francis | 210/620 |
| 5,114,586 | 5/1992 | Humphrey | 210/620 |
| 5,141,647 | 8/1992 | Bhodra | 210/620 |
| 5,433,854 | 7/1995 | Dickerson | 210/620 |
| 5,462,666 | 10/1995 | Kimmel | 210/614 |
| 5,527,465 | 6/1996 | Dickerson | 210/620 |

Primary Examiner—Thomas G. Wyse
Attorney, Agent, or Firm—Warner J. Delaune

[57] ABSTRACT

A method of treating wastewater prior to being processed within a wastewater treatment facility is provided, wherein the wastewater is delivered to the wastewater treatment facility by a collection piping system having an interior surface, and wherein the wastewater includes a predominant waste material, the method comprising: introducing select microbes into the piping system in an amount proportional to the surface area of the interior surface of the piping system, wherein the select microbes are capable of completely consuming the predominant waste material in the wastewater, until a biomass comprising almost entirely the select microbes is formed along the interior surface of the piping system; monitoring the biological oxygen demand (BOD) level of the wastewater at a downstream location immediately prior to the wastewater treatment facility in comparison to a desired BOD level; and adjusting the introduction of the select microbes into the piping system in proportion to the average downstream flowrate of the wastewater through the piping system to minimize the difference between the monitored BOD level and the desired BOD level.

10 Claims, 4 Drawing Sheets

5,788,841

METHOD FOR IMPROVING WASTEWATER TREATMENT

This application is a continuation-in-part of Ser. No. 08/587,554 filed Jan. 17, 1996, now U.S. Pat. No. 5,578,211.

BACKGROUND OF THE INVENTION

I. Field of the Invention

The present invention relates generally to the treatment of wastewater, and more particularly to the conversion of sewage collection piping systems into an effective treatment step prior to entering a wastewater treatment facility. The result of such treatment is an increase in efficiency of wastewater treatment facility operation and the reduction of undesirable gases within the wastewater.

II. Description of the Problems

A. Undesirable Wastewater Gases

In the treatment of wastewater, lift stations and pretreatment facilities are often plagued by two distinct, but related, problems: the generation and release of malodorous gases, caused by hydrogen sulfide and mercaptans, and structural damage caused by the same microbes responsible for the presence of the gases. Because the problem of structural damage to these facilities has a more direct economic impact upon the municipalities whose charge it is to treat the wastewater, this invention primarily involves methods for protecting wastewater lift stations and pretreatment plants from such damage. The structural damage is largely the result of biological attack with the microbes feeding off the gases released from the sewage as it passes through the structures. As part of this feeding, the microbes attack the substrate material, e.g. the walls, ceilings, and other surfaces, within the structure to which they are attached as an additional source of food. These mechanisms are discussed in detail in my prior patents, U.S. Pat. No. 5,433,854, and U.S. Pat. No. 5,527,465, the disclosures of which are incorporated herein by reference. Areas where the climate is mild most of the year, such as Florida, experience such problems in an ongoing manner. Publications such as the Florida Water Resources Journal recount the problems in articles such as "Hydrogen Sulfide Corrosion Control", Odom, et al., July 1993, pp. 40–42. This article defines the problems and suggests the use of protective coatings within the piping and structures to "increase the expected life span" by protecting against attack. Importantly, the authors note that there is no solution in preventing the attack, only protecting against it.

The aforementioned patents concern the introduction of controlled amounts of ozone-containing air to the vapor space immediately above the liquid level within the lift stations and pretreatment structures. The quantity and method of introduction of the ozone-containing air is such that sufficient amounts of ozone are available at the surface of the liquid to destroy the gases which the microbes use as food as they evolve. Furthermore, the amount of ozone is such that its biocidal effects destroy the microbial mass on the interior surfaces of the structures, thereby preventing damage to the structure. Destroying the gases and bacteria result not only in the prevention of structural damage, but also in the elimination of foul odors which are ordinarily present.

In the course of applying the ozone-containing air to various structures, it became apparent that the amount of ozone required to accomplish the destruction of gases and biomass could be reduced if the quantity of gas being released from the water could be reduced. Furthermore, not only would a reduction in the quantity of the gas be a benefit, but reducing the concentration of certain odorous compounds, such as hydrogen sulfide and mercaptans, would also be advantageous. This is especially true in piping systems where the wastewater is pumped long distances in what are commonly referred to as "forced mains". These pipes often cover distances of several miles and are completely filled with wastewater. The long distances mean that the wastewater often stays in the piping system for many hours (over one day in some cases), which results in a total depletion of oxygen within the piping system. The lack of oxygen is often referred to as a "septic" condition, and it is generally accompanied by the production of very foul odors and large quantities of hydrogen sulfide gas.

In order to completely understand this phenomenon, one must envision the interior surface of the wastewater piping system. Since the wastewater is filled with microbes, the microbes form a film of biomass on the interior surface of the pipe. This is particularly true of large diameter piping where low flow velocities prevent the force of the flow from scouring the surface with solid particles of sand and other matter. This film of biomass adapts readily to its environment, and it evolves with the dominant species of microbes that survive best under those conditions.

In nearly all instances, microbes that produce hydrogen sulfide gas as a by-product of their consumption of sulfer-containing material (hereinafter referred to as "sulfur reducing bacteria" or "SRB's") will be the dominant species. These microbes do not require oxygen, are always present in human waste, and grow rapidly on the walls of the piping system. They also grow on the suspended solids in the waste and on that portion of the suspended solids that settle out in the pipe when there is little or no flow. This occurs because anaerobes, i.e. microbes that exist without oxygen, such as sulfur reducers, only reproduce when they are attached to a surface. This surface may be the wall of the pipe or some bit of suspended matter. When the wastewater is moving slowly or not at all, the hydrogen sulfide gas produced by these bacteria accumulates in the wastewater in their vicinity.

In addition to the SRB's, other anaerobic bacteria exist in the system. These may vary in nature, but the most prevalent bacteria which compete with the sulfur reducers are methanogens. These bacteria primarily produce methane gas rather than hydrogen sulfide, and they compete, along with other bacteria, for food and space within the system. Unfortunately, without intervention, the SRB's usually dominate most of the time.

Another aspect of these closed piping systems that is often overlooked is the fate of the methane gas and its role in the piping system. Methane is virtually insoluble in water, so it collects as a separate gas phase within the piping system. Piping designers have positioned so-called "air release valves" at strategic points within the piping to relieve what they mistakenly believed was air. In actual practice these valves are almost always out of service, because the biomass fouls the mechanism, causing them to fail in the open position. This failure often results in wastewater being discharged on the ground. Moreover, operators who must operate these valves manually are understandably reluctant to make frequent adjustments to the valves, because the concentration of hydrogen sulfide gas is very high and offensive to the area.

When the gas cannot be released through the valves, the insoluble methane gas collects at the top of the pipes until the bubble is large enough to move downstream. This condition contributes greatly to the problems in two key respects. First, the methane gas bubble interferes with the normal hydraulic flow within the piping. Second, the hydrogen sulfide gas is highly soluble in methane, and it can accumulate in the gas phase in concentrations many times that of the water phase concentration (as has previously been shown in my '854 patent). When this accumulation occurs and the bubble of high strength methane gas enters a lift station, very high concentrations of hydrogen sulfide gas are released, because the hydrogen sulfide is already in the insoluble methane gas phase. In such instances, depending upon a number of variables, the volume and concentration may be such that the methods described in my previous patent will be less effective, because there may not be enough available ozone within the vapor space. When this happens, noxious odors may still be a problem due to the hydrogen sulfide being vented. Clearly, this is an undesirable situation.

Therefore, the present invention is directed in part toward preventing the formation of large quantities of hydrogen sulfide and methane gas within the wastewater collection piping system prior to lift stations and treatment facilities. By preventing such formation, the amount of hydrogen sulfide and methane gas entering the facilities is kept within ranges wherein various ozone-treatment methods, such as that disclosed in the '854 patent, can be practiced without periodic disruptions. Furthermore, it allows those methods to be applied in places that would, under other circumstances, be impractical.

B. Sludge Production

Another related problem is the highly variable amount of undigested materials prior to entry of the wastewater into the wastewater treatment plant, as well as high levels of sludge production once this wastewater has been fully treated. Both of these problems are due in large part to the presence of SRB's and other types of inefficient microbe populations competing randomly within the wastewater. However, both can be controlled and minimized by many of the steps taken to reduce the undesirable gases, as mentioned in my prior application Ser. No. 08/587,554, to be issued as U.S. Pat. No. 5,578,211 on Nov. 26, 1996, the disclosure of which is incorporated herein by reference.

It has been known for many years that addition of microbes within the actual treatment plants can improve the efficiency of operation. Indeed, it has been demonstrated repeatedly in instances where the treatment plant was "overloaded" with biological oxygen demand (BOD) that the addition of a substantial quantity of "robust" microbes at the plant inlet could cause an improvement in the efficiency of the plant and thereby reduce the contaminants in the plant effluent. This approach was often taken to bring a plant into compliance with discharge permit limits.

Historically, the cost of adding such microbes in sufficient quantities to affect plant performance was virtually prohibitive, except in cases where penalties for noncompliance with permit requirements were severe. However, the present invention avoids the addition of microbes to the plant itself, because the microbes necessary for optimum plant performance are cultivated within the collection piping system as the wastewater flows to the treatment plant. This occurs through the addition of select, symbiotic, facultative microbes through the process of competitive exclusion to replace the "wild" biomass with one designed to effectively treat the waste while displacing those bacteria, such as methanogens, that cause odorous gases.

Without the practice of the present invention, the indigenous or "wild" microbes within the collection piping system are a mixture of facultative and non-facultative microbes, many of which cause odorous gases. Although there is some level of treatment which occurs, it is unacceptably inefficient. In the absence of oxygen, only anaerobes and facultative bacteria perform the task of destroying contaminants during the transportation of the wastewater to the treatment plant. The aerobic, non-facultative bacteria simply take up space within the piping system, waiting to arrive at the treatment plant and work in the presence of oxygen. The present invention increases the productive facultative microbes (with a corresponding decrease in strict anaerobic microbes) that are needed to rapidly digest the waste within the piping system, and it insures that a greater percentage of the microbes are productive within the plant. This is important because the strict anaerobic bacteria that arrive at the treatment plant only serve to take up space in the aerated portion of the treatment process. Furthermore, the "wild" anaerobic bacteria often die in the presence of oxygen and, once dead, in addition to taking up valuable space in the aeration process, they do not settle well in the clarification equipment. Since settling is a prime part of the process, and speed of settling important to plant hydraulic capacity, any reduction in the presence of unproductive, strict anaerobes will cause an improvement in the plant operation. Thus, conversion of the collection piping system to a treatment step not only removes "wild" bacteria that would arrive at the treatment plant and be detrimental to operation, it replaces them with bacteria designed to work in both anaerobic and aerobic states, without producing odorous gases.

Therefore, the present invention is also directed in part to reducing the BOD of the wastewater prior to its entry into treatment facilities so that such treatment facilities can operate at more efficient levels. In doing so, sludge production by in-plant treatment processes can be kept to a minimum, resulting in significant cost savings for virtually all aspects of the wastewater treatment cycle.

III. Description of the Prior Art

With regard to odor control, there are a number of techniques which have been proven to reduce the presence of hydrogen sulfide in wastewater. These techniques typically involve the addition of chemicals to react with the hydrogen sulfide and render it into another state where it becomes essentially odorless. Such chemicals include iron salts, hydrogen peroxide, caustic soda and chlorine. Some chemicals, such as hydrogen peroxide and chlorine, also act as a biocide to kill the biofilm on the pipe walls. Other compounds include nutrients which stimulate methanogenic bacteria to "competitively exclude" the SRB's, compounds touted to add oxygen to the wastewater, and compounds which prevent the SRB's from producing hydrogen sulfide gas.

Upon critical examination of these and other techniques, several points are apparent. First, since the flowrates within the complex piping system cannot easily be controlled, nor can the composition of the wastewater, it is impossible to know when or how much of a given chemical should be added to the system. It is also impossible to consistently control the hydrogen sulfide concentrations. In most instances, the cost of adding even a modest amount of chemicals proves to be economically disadvantageous. Second, the use of such chemicals involves some type of tradeoff in that the treatment system suffers somewhere else in the collection piping system as a result of adding the chemicals. Finally, based on the problems presented by the first two points, a different approach is needed that will overcome these obstacles.

When examining the mechanisms within the piping that bring about the production of hydrogen sulfide and methane gas, it becomes apparent that the best solution is to work within the biological mechanisms themselves. The prime mechanism at work is "competitive exclusion". The SRB's are well-suited to their environment, and they dominate the other microorganisms competing for the same food and space. However, the SRB's themselves are subject to competitive exclusion if other more dominant microorganisms are introduced in numbers that are effective.

Numerous demonstrations by others have been made of adding select microbes on a "batch" basis to collection piping systems to reduce hydrogen sulfide production. In nearly all cases, significant reductions in hydrogen sulfide concentrations resulted. Indeed, some demonstrations temporarily added microbes on a continuous basis from large drums at various locations with some degree of success. These demonstrations were all focused on controlling odors at certain lift stations and treatment plants. Even though they enjoyed some success in reducing the odor levels, they could not, as previously demonstrated in my prior work, eliminate all the odors nor stop the structural damage. Because of this lack of complete success and the ongoing cost of microbe addition, such projects were soon abandoned.

As will be explained further herein, the only successful way to deal with the hydrogen sulfide is to eliminate the source, which are the SRB's that exist in the biomass on the walls of the collection system piping. Any solution that does not include the elimination of SRB's is analogous to treating the symptoms of a disease rather than the cause. Prior to this discovery, the standard methods of dealing with SRB's involved either biocidal destruction (as explained earlier herein) or the injection of oxygen into the system. Since SRB's are strict anaerobes, the presence of oxygen prevents them from working. The problems with these methods are readily apparent. First, SRB's can go into a dormant "spore" state very quickly. This is a survival technique which literally shuts down the microbe until favorable conditions return, and only certain powerful and expensive biocides can kill the SRB's even in spore state. Second, the human body contains SRB's in the lower digestive tract, and they are constantly re-introduced into the collection system by way of fecal matter.

Injection of oxygen into the piping is not only expensive, but presents an ongoing challenge as the aerobic microbes, which utilize the oxygen, multiply rapidly. As the aerobic microbes increase, an ever-increasing amount of oxygen is needed, and a point of diminishing returns is rapidly reached. The bottom line is that neither of the previous methods is very effective in practice, nor are they economical. Furthermore, the use of biocides in the piping will have a negative impact on the operation of the treatment plants.

Various prior art methods suggest the viability of using select microbes to compete with the sulfur reducing bacteria. However, many of those methods focus only on the reduction of SRB's in connection with oil and grease. Mention is occasionally made of utilizing the collection piping system to degrade the waste, but no specific details are given on how to accomplish this other than to add certain microbes to the piping system. The references provide insufficient information as to which types of microbes are effective, how to determine the amount of microbes to add, and what means of delivery of these quantities should be employed.

SUMMARY OF THE INVENTION

One object of this invention is to provide a method for reducing the presence of hydrogen sulfide and methane gas within sewage collection systems.

Another object of this invention is to provide a method for reducing such gases by the introduction of select microbes into the collection system.

It is also an object of this invention to provide a method for reducing such gases which is more cost effective and controllable than previous techniques.

Still another object of this invention is to convert the collection piping system to a treatment step which reduces influent BOD at the wastewater facility.

Therefore, a method of treating wastewater prior to being processed within a wastewater treatment facility is provided, wherein the wastewater is delivered to the wastewater treatment facility by a collection piping system having an interior surface, and wherein the wastewater includes a predominant waste material, the method comprising: introducing select microbes into the piping system in an amount proportional to the surface area of the interior surface of the piping system, wherein the select microbes are capable of completely consuming the predominant waste material in the wastewater, until a biomass comprising almost entirely the select microbes is formed along the interior surface of the piping system; monitoring the biological oxygen demand (BOD) level of the wastewater at a downstream location immediately prior to the wastewater treatment facility in comparison to a desired BOD level; and adjusting the introduction of the select microbes into the piping system in proportion to the average downstream flowrate of the wastewater through the piping system to minimize the difference between the monitored BOD level and the desired BOD level.

DETAILED DESCRIPTION OF THE INVENTION

Figure 1:
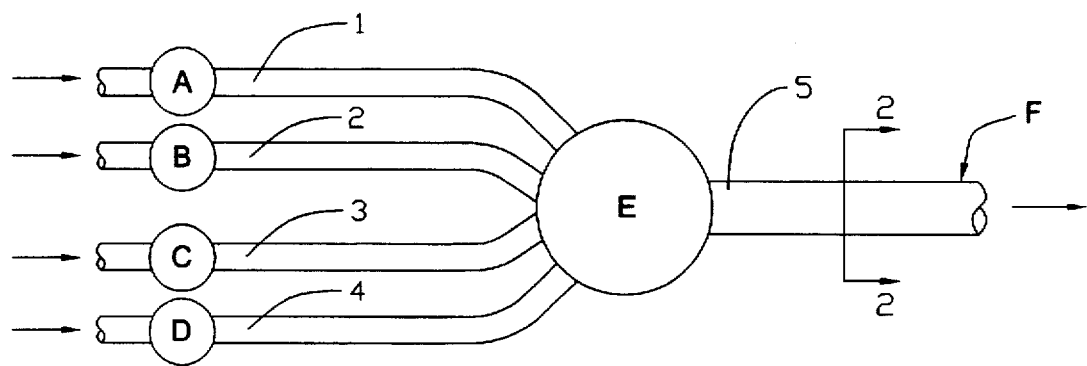
FIG. 1 is a schematic diagram depicting a portion of a typical collection piping system used to collect wastewater in sewage treatment systems.
Figure 2:
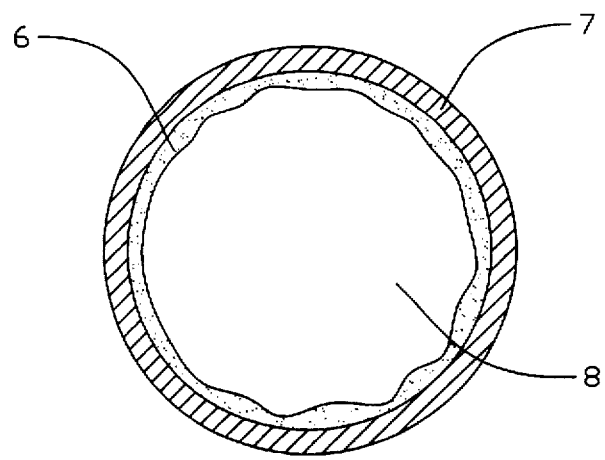
FIG. 2 is a cross-sectional view taken along Section 2—2 of FIG. 1 to illustrate the presence of the biomass adhering to the interior surfaces of the piping system.

Turning now to FIG. 1, a portion of a typical collection piping system is shown to comprise, by way of example only, four smaller conduits 1–4 which converge into a larger single conduit 5 leading toward other conduits or a treatment plant (not shown). Further details of FIG. 1 and its relationship to the present invention will be provided later herein. A cross-sectional view of the piping system is also shown in FIG. 2, taken along Section 2—2 of FIG. 1, depicting the manner in which the biofilm 6 adheres to the inside pipe surface 7. The formation of this biofilm 6 is critical to the effective treatment of the wastewater 8, and it may be referred to as an "anaerobic fixed film bioreactor". The biomass can be adjusted through competitive exclusion to affect not only the SRB's, but also actively degrade the wastewater contaminants as they flow to the treatment plant. As a result, the control of hydrogen sulfide can be accomplished while reducing the amount of organic contaminants (both dissolved and suspended solids), with the overall benefit of a reduction in the total biological oxygen demand (BOD) at the treatment plant entrance. Since each pound of BOD translates into a certain amount of sludge, which requires disposal, such reductions in BOD would reduce treatment plant operating costs. The combined effect would be to reduce the amount of hydrogen sulfide in the collection system while reducing the sludge production at the treatment plant. In current practice, the cost of sludge processing and disposal is approximately 50% of the ongoing operating cost of the treatment plant. The savings related to sludge will more than pay for the cost of administering the present invention.

In order to have the desired affect on the biomass, select microbes must be added in sufficient quantities and at strategic locations in the outermost reaches of the piping network. In order to achieve this in an economical fashion, a new understanding of the dynamics of the collection system and new technology involving microbes was required.

To illustrate, an example is taken of a small portion of a collection system, shown in FIG. 1. The portion deals only with the forced mains, because most gravity mains have good contact with air and are not strictly anaerobic. The example consists of four segments 1–4 of 6-inch diameter piping, each 1,000 feet in length, which connect into a single 12-inch diameter segment 5, also 1,000 feet in length.

general, flow in the outer reaches occurs only about a total of 4 hours per day. This 4-hour total is spread over three main periods, namely early to mid-morning, early evening and late evening. These periods correspond to the times when most people are getting ready for work, coming home and just before bedtime.

Therefore, there are periods when there is no flow in the piping and the segments are "stagnant". When stagnant periods occur, the piping behaves like a batch-type incubator. At other times it resembles a flow-through reactor. In the batch-type mode, the volume in the piping segment is fixed while the "free swimming" biomass continues to accumulate as the biomass on the piping walls reproduces. In the flow-through mode, the accumulations of free swimming biomass move down stream into the larger diameter piping.

In actual practice, the total length of small diameter piping is many times that of the larger diameter piping. The ratio of the inside piping wall area to the volume is much greater in the smaller segments 1–4 than in the larger segment 5, as evidenced by the data from Table 1. The importance is shown by comparing the total wall area of the four branches 1–4 to the total wall area of the trunk segment 5. The combined branches 1–4 are double the inside wall area of the trunk segment 5. A similar comparison of the volumes shows that the total volumes, however, are the same.

The analysis of Table 1 assumes that the inside surface area of the piping is completely filled with microbial mass.

TABLE 1

| | Collection System Network Analysis | | | | | | |
|---|---|---|---|---|---|---|---|
| SEGMENTS | A-E | B-E | C-E | D-E | A/D-E | E-F | TOTAL |
| PARAMETERS | | | | | | | |
| PIPE SIZE (inches) | 6 | 6 | 6 | 6 | | 12 | |
| AREA (sq.ft./ft.) | 1.5708 | 1.5708 | 1.5708 | 1.5708 | | 3.1416 | |
| VOLUME (cu.ft./ft.) | 0.19635 | 0.19635 | 0.19635 | 0.19635 | | 0.7854 | |
| LENGTH (ft.) | 1000 | 1000 | 1000 | 1000 | 4000 | 1000 | 5000 |
| Total volume (cu.ft.) | 196.35 | 196.35 | 196.35 | 196.35 | 785.4 | 785.4 | 1570.8 |
| Total volume (gal.) | 1473 | 1473 | 1473 | 1473 | 5891 | 5891 | 11781 |
| Total volume (cu.mm × $10^9$) | 5.52 | 5.52 | 5.52 | 5.52 | 22.08 | 22.08 | 44.16 |
| Total area (sq. ft.) | 1570.8 | 1570.8 | 1570.8 | 1570.8 | 6283.2 | 3141.6 | 9424.8 |
| Total area (sq. mm × $10^7$) | 1.17 | 1.17 | 1.17 | 1.17 | 4.68 | 2.35 | 7.04 |
| MCU DENSITY × $10^6$ | 1.17 | 1.17 | 1.17 | 1.17 | 4.70 | 2.35 | 7.04 |
| MCU Surface Populat. (× $10^{13}$) | | | | | | | |
| Vol. concentration/cycle (× $10^3$) | 2.13 | 2.13 | 2.13 | 2.13 | 8.50 | 1.06 | 9.57 |
| 4 HOUR NO-FLOW CONCENTRATION MCU concentration per 16 cycles (× $10^4$) | 3.40 | 3.40 | 3.40 | 3.40 | 13.60 | 1.70 | 15.30 |
| 20 HOUR NO-FLOW CONCENTRATION MCU concentration per 40 cycles (× $10^4$) | 8.50 | 8.50 | 8.50 | 8.50 | 34.00 | 4.25 | 38.25 |
| DESIGN VELOCITY 2 ft./sec. | | | | | | | |
| FLOW RATE (cu.ft./sec.) | 0.3927 | 0.3927 | 0.3927 | 0.3927 | 1.5708 | 1.5708 | 3.1416 |
| FLOW RATE (gal./min.) | 176.72 | 176.72 | 176.72 | 176.72 | 706.86 | 706.86 | 1413.72 |
| 4 HOURS FLOW VOLUME (gal. × $10^4$) | 4.24 | 4.24 | 4.24 | 4.24 | 16.96 | 16.96 | 33.92 |
| Total biomass per segment - 20 hours NO FLOW (× $10^{14}$) | 4.70 | 4.70 | 4.70 | 4.70 | 18.80 | 9.39 | 28.19 |
| Total biomass per segment - 4 hours NO FLOW (× $10^{14}$) | 1.88 | 1.88 | 1.88 | 1.88 | 7.51 | 3.76 | 11.27 |

Table 1, entitled "Collection System Network Analysis" is an analysis of the piping network in the example. This analysis makes some simplifying assumptions to make it easier for the reader to understand the dynamics of the system. Collection system flows vary with the nature of the homes or businesses connected to the various branches. In According to the teachings of Day (U.S. Pat. No. 5,413,713), this mass will reproduce itself every 20 to 60 minutes. Therefore, the concentration of free swimming microbes within the stagnant segments will increase, periodically, by an amount equal to the wall population. Now, consider that the wall surface area is populated by a mixture of microbes, all competing for space to attach themselves so that they may reproduce. Recall that anaerobes can only reproduce when attached to some surface.

Another factor in the growth of the biofilm is that the reproductive rates of the various microbes are a function of the genetic makeup of each microbe and the available supply of food. As the different microbes have different metabolic pathways, i.e. they consume and excrete different molecules, the overall population will be dictated first and foremost by the available food supply and secondarily by the reproductive rate. Since the reproductive rate is genetically controlled, under a given set of food supply conditions, symbiotic microbes with higher reproductive rates will dominate the population.

Furthermore, since it is the nature of life forms to adapt to changing conditions (commonly referred to as mutating) the overall population will be adjusting each strain's metabolic pathway towards optimization under the current conditions. In commercial biological processes, great care is taken to attain a steady state condition with pure strains of bacteria to prevent the natural mutation process from occurring and thereby changing the bio-product. Contrarily, a sewer collection system has a dynamic state that is constantly changing.

To overcome the dynamics of the biomass on the sewer collection system piping walls, the present invention utilizes the competitive exclusion principle. Table 1 represents the calculation of total wall biomass on a simple example system segment. A mean colony unit (MCU) population density of $1.0 \times 10^6$ microbes/sq. mm is used for the wall biomass calculation for convenience. Note that the cyclical buildup of free swimming microbe concentrations (Volume concentration/cycle) is larger in the smaller diameter piping ($2.13 \times 10^3$ microbes/cu. mm) than in the larger piping ($1.06 \times 10^3$ microbes/cu. mm). This is due to the greater ratio of inside wall surface area to volume in the smaller segments. The example assumes a 30-minute average reproductive cycle to represent all populations. If one assumes that the typical "batch" or no-flow period is 4 hours, then the total microbe population in the smaller pipe segments reaches $7.51 \times 10^{14}$ microbes. This population exists in a total volume of 5.891 gallons. When this amount moves downstream during a pump period, it then resides in the next segment. As Table 1 vindicates, the total number of microbes in the downstream segment will suddenly double. When the flow stops in this condition, as is often the case, there is a sudden surge in microbe population density. Since the water with the microbes is the same water that the microbes have been feeding on upstream, the tendency for competitive exclusion in the downstream segments is towards the more efficient microbes.

This tendency carries over to the wall biomass resulting in a shift in the dominant microbe species. In many cases, especially where sulfur is in large supply in the water either from normal contaminants or naturally occurring in the drinking water, the SRB's will become dominant. Since one of the products of SRB metabolism is hydrogen sulfide, the amount of hydrogen sulfide in the water will therefore increase. If the segment remains stagnant for any significant period of time, the SRB's will continue to increase until the available food supply begins to decline. At that point, some of the SRB's will cease to function and enter a "spore" state. These spore-state microbes will resume their metabolic processes when the flow starts moving again and more nutrients become available from new additional piping segments.

The present invention utilizes select symbiotic bacteria with a high reproduction rate and minimum gas production to out-compete the SRB's and certain other bacteria. These select bacteria are normally found in sewer systems, but their numbers are commonly small and are not in the correct ratios for optimum performance. As a result, the SRB's, under normal conditions, usually out-compete these select microbes.

In order to gain and hold the advantage over the SRB's, the select microbes must be introduced in significant quantities at specific times. Ideally, these bacteria will not only competitively exclude the SRB's, but also most of the naturally occurring biomass on the piping walls. When introduced in correct proportions, these select microbes not only consume the available material in an efficient manner, but also reproduce themselves in the similar fashion as indicated in Table 1. These ever-growing populations of select bacteria will consume the available material and reinforce each other as the flow moves through the collection system.

The advantage to treatment in the piping over conventional plant treatment is that the free swimming microbes consume the available food material without reproducing. Therefore, there is a reduction in contamination without the substantial increase in microbial mass which always accompanies aerobic treatment within the treatment plant. Furthermore, many of the select microbes available for use with the present invention are "facultative", which allows them to switch to aerobic metabolism at the treatment plant, further improving treatment plant performance.

In normal commercial operations, microbes are sold as concentrates with microbe colonies in concentrations ranging from $10^7$ to $10^8$ to the cubic millimeter. At these concentrations, a large volume of microbe solution is needed for even modest wastewater flow volumes, and the number of gallons per day per site would be prohibitively expensive. However, new technology has evolved where microbes are concentrated or compressed to $10^{13}$ microbes/cu. mm and higher. Therefore, new concentrations 10,000 to 1,000,000 times more concentrated than before can be produced. What once took twenty tanker trucks can now be reduced to a gallon container, volumetrically, or less. Consequently, dosing concentrations where a single cubic millimeter can contain more microbes than entire segments of piping with long stagnant periods can now be applied to control the biomass within the piping in an affordable manner. For example, a dosing station can have a five-liter bag and a battery-powered, microprocessor-controlled pump which adds a small, predetermined amount of concentrate according to a specific dosing schedule coinciding with the forced main pumping operation. Of course, the present invention is not to be limited to introduction of only those microbes which can be suspended in spore state. Some bacteria that are of interest in improving the performance of flowing, in-pipe treatment are not spore forming. Previously, it was thought that only spore forming bacteria could be concentrated to the limits needed to effect competitive exclusion. However, techniques have recently been developed to concentrate non-spore forming bacteria to the levels required by the process, rendering them equally effective in many instances.

The amount of concentrate and concentration of microbes added are determined by first calculating the actual wall surface area within the given piping segment, e.g. A–E or C–E. The types of microbes used and their ratio within the dosing mixture will be a function of the nature of the waste water being added to the collection system in the area of the segment. Ideally the microbe mixture will support complete consumption of the available food supply. For example, the dosing mixture used for an area with a commercial brewery discharging to the collection system will be different from that used in an ordinary residential area. The dosing mixture used in restaurant areas will be geared for significant oil and grease loads, and dosing mixtures in the area of a bakery will be adjusted for carbohydrate reduction. Therefore, the precise microbes used and the precise ratios of such microbes in the dosing mixture may be determined through routine laboratory experimentation using representative samples of the wastewater in the collection system.

The reason for using the wall surface area as the controlling factor in the amount of concentrate added is to avoid adding too many microbes. A small excess of microbes is of no consequence, but a large excess may result in rapid consumption of the available food source and reversion to spore state. This is very possible if the available nitrogen supply is depleted. The select facultative microbes in the anaerobic state rely upon nitrogen for their metabolic processes. Therefore, if the available nitrogen supply is depleted, the select facultative microbes will cease functioning before the food supply is depleted, and the SRB's will return.

The addition of the concentrate must continue, even after the SRB's have been virtually eliminated, to prevent the SRB's from recurring in large numbers. Once the piping wall biomass has been converted to that needed to facilitate utilization of the food source in the water, the converted biomass areas act as incubators to enhance and intensify the effect downstream and work towards elimination of reproduction of the SRB's on the downstream piping walls. It is imperative, however, that the collection system be properly monitored and that dosing continue on a regulated basis to prevent the re-establishment of the SRB colonies as such re-establishment will begin the cycle again, only in favor of the SRB's.

To fully realize the sludge reduction benefits of the present invention, several additional steps must be taken. Based on the particular parameters affecting the system at hand, one should select a desired BOD level that is hoped to be achieved by implementation of the present inventive method. After this desired BOD level is defined, and once the appropriate biomass is established within the collection piping system, the BOD level should be monitored at a location along the collection piping system immediately prior to the wastewater treatment facility. The monitored BOD level should then be compared to the desired BOD level to ascertain whether more or less of the select microbes should be introduced at the upstream dosing stations. If the difference between the desired BOD level and the monitored BOD level is large, i.e. the monitored BOD level is unacceptably high, then additional microbes should be introduced with the goal of minimizing the difference between the desired BOD level and the monitored BOD level. During this maintenance phase of the process, it is important to recall that the BOD conditions within the collection piping system can be quite dynamic. Assuming that the content of the wastewater will remain roughly the same over time, BOD fluctuation will depend primarily on the flowrate of the wastewater. Therefore, any adjustments to the amount of microbes introduced at the dosing stations should be made in proportion to the flowrate. Preferably, since the flowrate may vary at different points downstream of the dosing station, the average downstream flowrate of the wastewater from the dosing station to the wastewater treatment entrance should be used as the basis for determining the amount of microbes to add at any given time.

In experiments conducted by the inventor, the invention was practiced on an advanced wastewater treatment facility in Florida, involving roughly 25% of the total flow into the facility. Portions of the treated section of the collection piping system were in excess of twenty miles from the treatment facility, and the estimated flow through the treated section was about 15 million gallons per day (MGD). The experiments were initially conducted for the purpose of odor control in the treated section. This treated section of the collection system was separate from the other portions, being combined only at the inlet of the facility. Based upon initial estimations of collection system piping surface areas and volumes, as well as the concentration of BOD in the wastewater, it was determined that an initial dose rate of 10 gallons of $10^{13}$ microbes per cu. mm concentrate per week, distributed over twelve dosing sites was sufficient to start. After two months of BOD decline, dosing reduction of about ten percent per month from the previous month was begun. The concentration of microbes was not changed, only the rate of application per total flow through the treated section over a 24-hour period. Upon analysis of the routine data from the entire plant performance, a number of improvements in plant performance were noted. Although it is impossible to determine the effects from treating the entire collection system, the observations from the entire plant as affected by treating about 25% of the total inlet flow are extrapolatable. In considering the experimental data, it is important to note that the experimentation began in July of 1995, and that the data in FIGS. 3–5 are the result of implementing the methods described herein on only 25% of the collection system.

Figure 3:
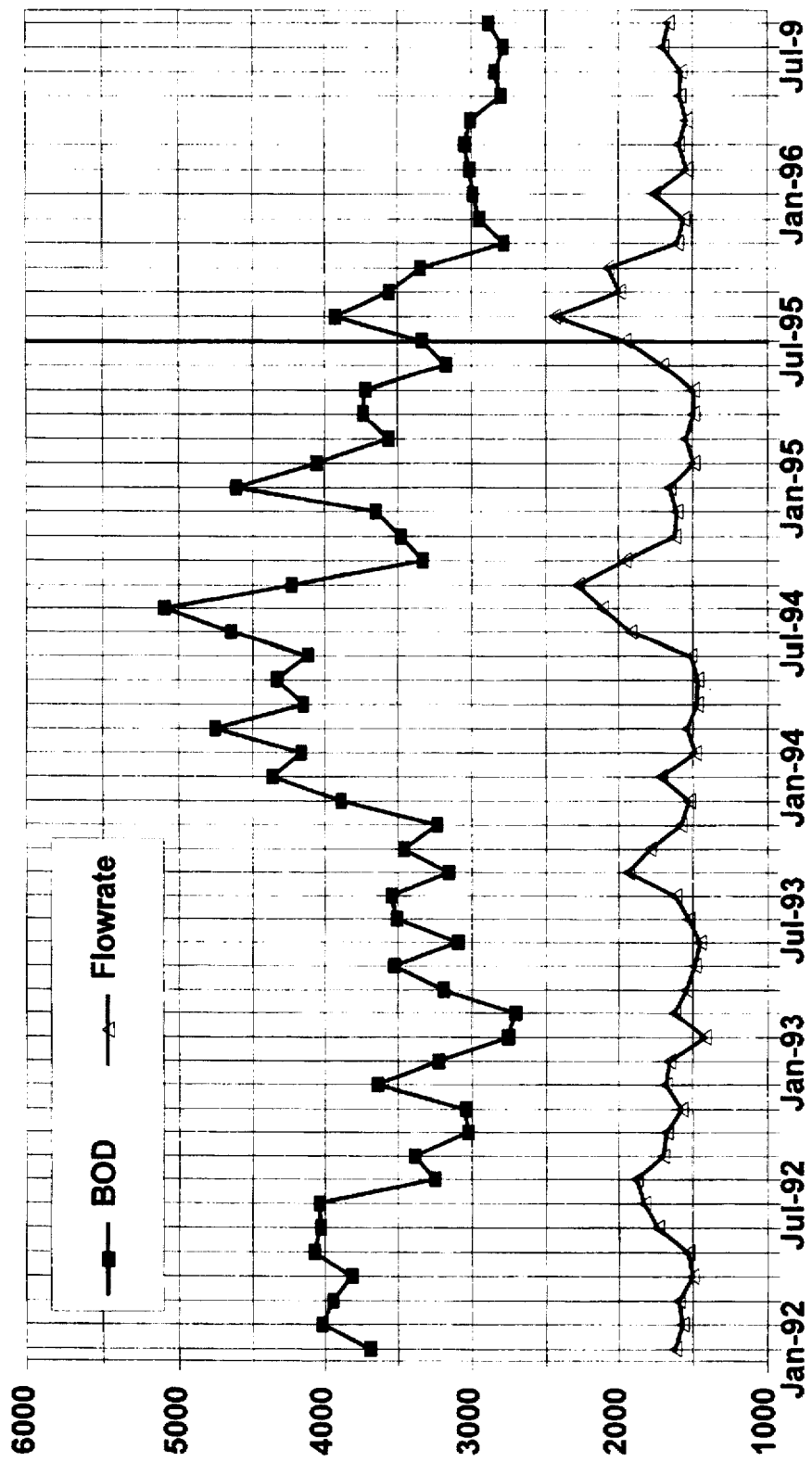
FIG. 3 is a chart showing the fluctuation of total plant inlet BOD over time.

FIG. 3 shows the total plant inlet BOD in pounds per month, as well as total plant flow, from January 1992 through August 1996. If one examines the historical data, it is clear that the total BOD varies substantially, especially with variations in flow. This has not been the case since July, 1995. A brief increase is noted immediately following commencement of the experiments followed by a rapid decline and "stabilization" in the first quarter of 1996 of the total amount. The brief increase was due to the replacement of the wall biomass with the new, facultative bacteria as explained later herein. Reductions in dosing rate continued until the end of the second quarter of 1996 until the rate of 5 gallons of concentrated microbes per week was achieved. Dosing was held at 5 gallons per week to allow stabilization to occur and evaluate whether further reductions were warranted. The decline and stabilization clearly indicates the substantial decline in BOD required within the treated portion to affect the total plant inlet BOD in such a manner.

Figure 4:
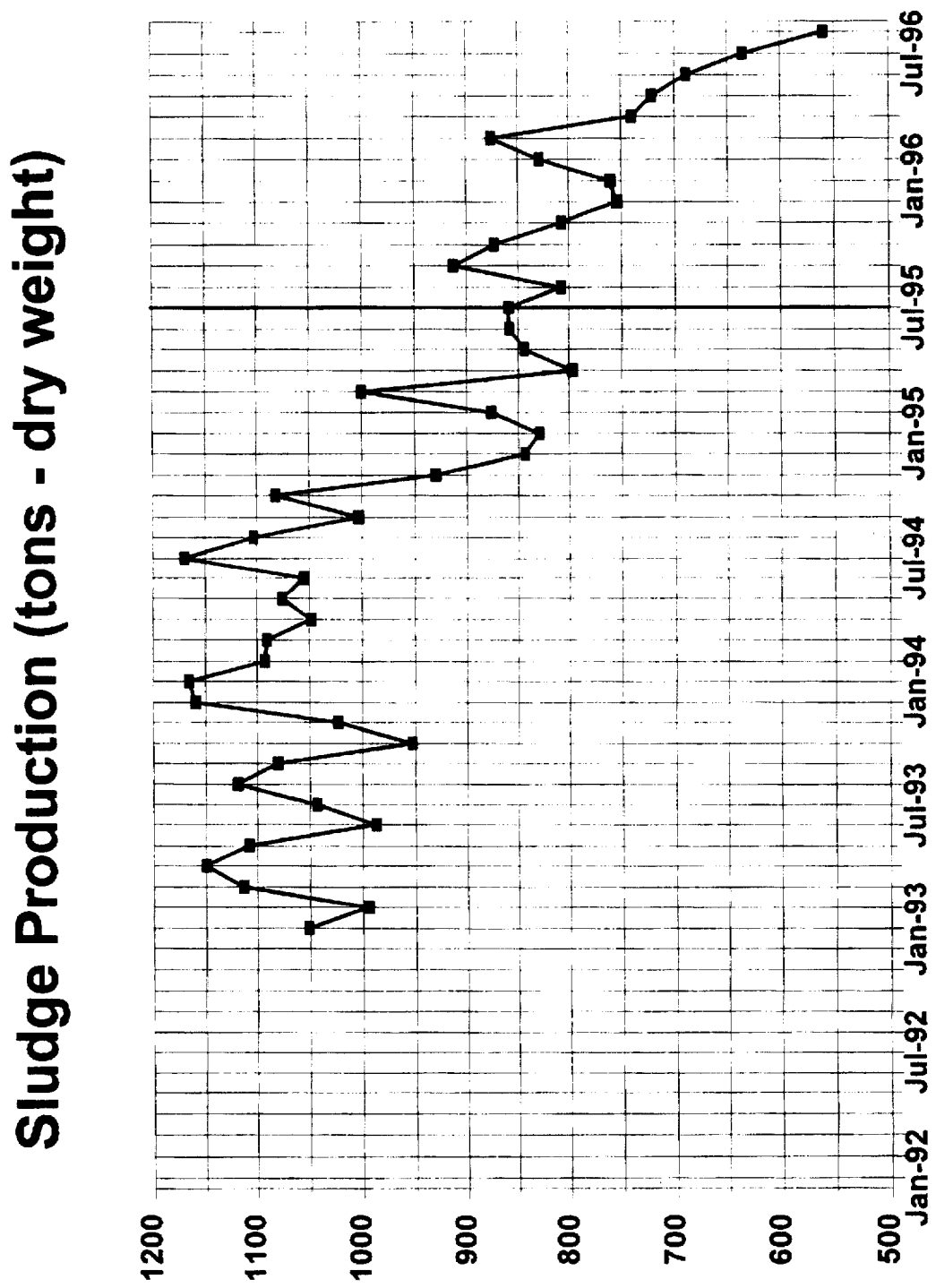
FIG. 4 is a chart showing the fluctuation of final sludge production on a dry weight basis over time.
Figure 5:
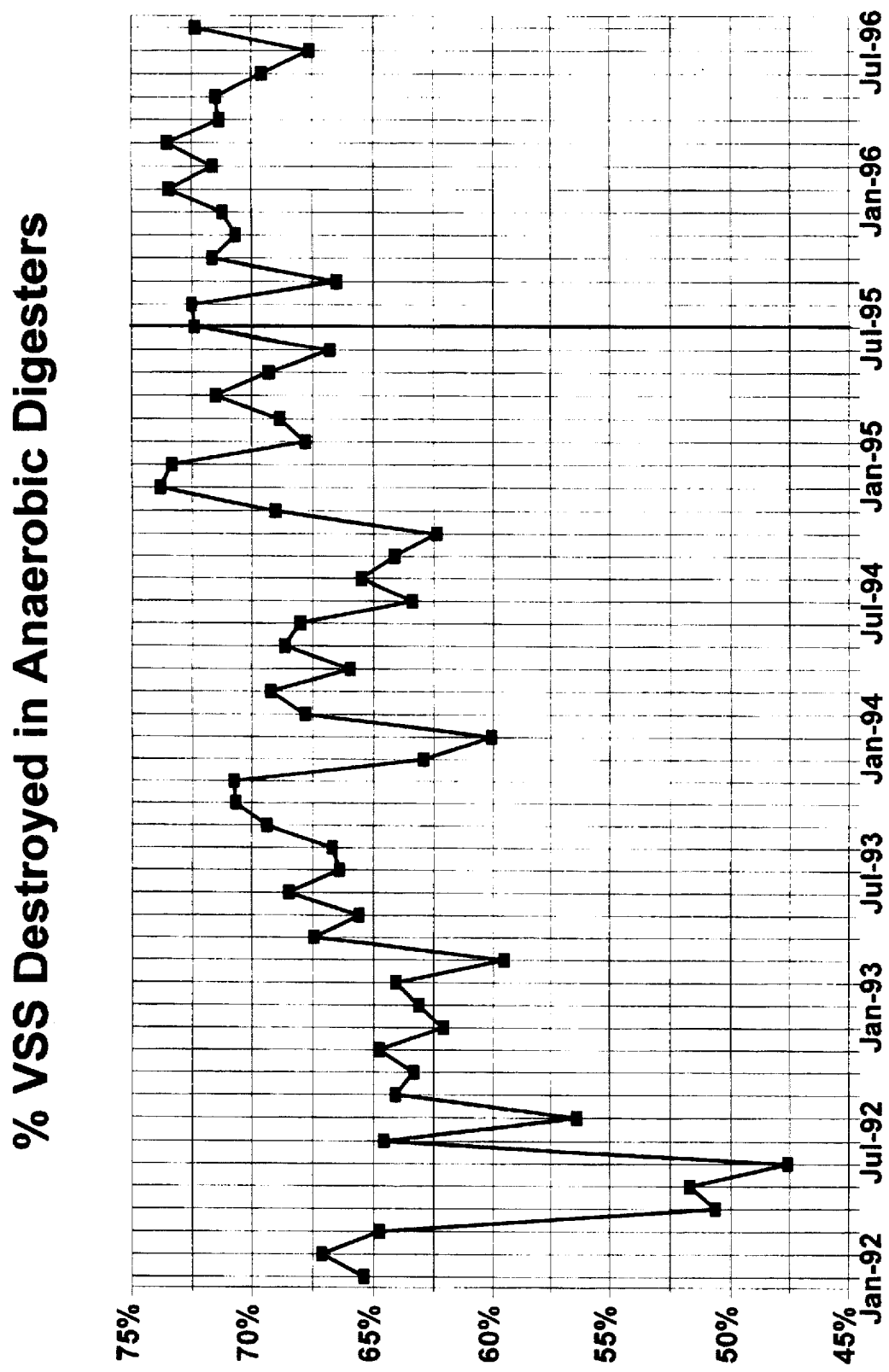
FIG. 5 is a chart showing the destruction of VSS over time as a percentage within the treatment plant during the same period.

FIG. 4 shows the treatment plant final sludge production on a dry weight basis. It is important to note that the plant has a design capacity of over 90 MGD and operates at about 54 MGD. Except in periods of very high rainfall, the plant operates in a "double pass" mode to maintain the hydraulics within the facility. This double pass configuration results in very high efficiency and an effluent with contaminant concentrations greatly below permit requirements. Note the decline in total pounds of sludge. The decline in sludge roughly parallels the decline in inlet BOD in the period from July-December, 1995, months, and it exceeds the inlet BOD reduction on a percentage basis. The logic behind the reduction in total sludge conforming to and exceeding the reduction in inlet BOD can be explained in the light of the improvement in performance of the plant due to the presence of the facultative microbes that were added in large concentration and grown through replacement of the piping wall biomass.

Material that would ordinarily not be converted to a format where it would show up in a five-day BOD test, but rather contribute directly to the sludge, is now converted to a degradable format. The normal measure of this is called the volatile suspended solids (VSS). When the amount of VSS in the solids produced in the treatment process prior to the anaerobic digesters increases while the total pounds of solids declines, the overall effect is a more complete conversion of the waste material to a format where it can be effectively digested in the anaerobic digesters. FIG. 5 shows the destruction of volatile suspended solids (VSS) across the two stages of anaerobic digestion as a percentage of the inlet to the digesters within the plant. The overall improvement in destruction of VSS is substantial and reflects the presence of the facultative microbes in abundant numbers.

As can be appreciated from the foregoing figures, employing the method of the invention since July, 1995, has shown remarkable, surprising, and heretofore unknown, improvements in the total operation of the wastewater collection and treatment system. The beneficial effects seen from the present invention far exceed that ever achieved by adding microbes directly to the influent line of a treatment plant. With new bacteria being grown in the collection system in large quantities and the added bacteria increasing the concentration of new, facultative bacteria, the overall effect is a constant supply of what I refer to as "robust" bacteria. With less BOD in the influent at the plant and more robust facultative bacteria present with much less strict anaerobic bacteria, the oxygen transfer in the aeration step is greatly improved.

Another important benefit of the present method is that the facultative bacteria present in the aeration step convert back to the anaerobic state in the anaerobic digesters. This overcomes the problem of maintaining a good colony of anaerobes in the digesters, which would otherwise be a problem with the normal large quantity of strict aerobes present from treatment.

It has also been discovered that the above process can be supplemented by the addition of mixtures of aerobic and anaerobic bacteria, in concentration, which have the ability to utilize hydrogen sulfide in their metabolism and generate elemental sulfur. This allows the further reduction of hydrogen sulfide in solution and the amount of ozone needed at the lift stations for odor control. This technique also reduces the need to practice the competitive exclusion at every small lift station, but rather affords the opportunity to treat modest amounts of hydrogen sulfide after it is generated and before the treatment plant. However, the amount of these bacteria in use must be carefully controlled so as not to conflict with the other microbes at the treatment plant.

Another addition to the mixture may be the use of bacteria phages specific to *e-coli* bacteria. Since *e-coli* represents a large portion of the final sludge solids and is resistant to digestion due to its cell wall structure, the introduction of phages (which are a virus that infects and destroys the *e-coli* cell by rupturing the cell wall) greatly enhances the destruction of *e-coli* cells. The overall effect is an additional reduction in final dry weight sludge. Phage introduction began in May, 1996, and its effects are apparent in FIG. 4.

As indicated in my previous patent, the amount of concentrate administered by each dosing station can be further fine-tuned by monitoring the nitrogen levels at various points downstream in the collection system. The preferred control point is to adjust the concentrate addition to where about 1.0 milligram per liter of total nitrogen or greater is present at all locations, although amounts as low as 0.1 milligram per liter may also be effective. This can only be determined by frequent testing in the early stages of practicing the invention. A secondary measure of success is the amount of dissolved hydrogen sulfide in the water stream. However, this only indicates the absence of SRB's and not whether excessive concentrate is present.

Another important aspect of the invention is that during the first one to three weeks of concentrated microbe addition, the levels of hydrogen sulfide in solution will increase dramatically in the downstream segments. This increase is the result of the displacement of the SRB's from the walls in the downstream segments of the system. As these SRB microbes are displaced, they move into the downstream piping and accumulate. This actually acts as a competitive exclusion process as the presence of these large number of SRB's in the downstream segments actually intensifies the presence on the piping walls. Also, the larger diameter piping usually has lower flow rates and, since highly anaerobic systems have high suspended solids settling rates (and the SRB's are suspended solids) the SRB's will settle out and accumulate in the piping.

The net result is a relatively short-term increase in SRB populations and, in turn, a potentially large increase in hydrogen sulfide production. This sudden, but temporary, increase in hydrogen sulfide production has erroneously caused users to judge microbial addition as counter-productive. This is especially true in very large systems where the increase period may be substantially more than two to three weeks. After several weeks have passed, however, the constant introduction of select microbe concentrate in the upstream segments, plus the incubation effect of the wall biomass, will result in colonization of the downstream segments by the select microbes.

It is during this startup period where the use of ozone, in accordance with the disclosure of U.S. Pat. No. 5,433,854, can be important. The application of ozone to critical points in the system will prevent the release of objectionable quantities of hydrogen sulfide during the startup period. Continued use of ozone at strategic locations is important after startup to counter the occasional situation where SRB's may try to reappear for any reason. Also, as stated in the '854 patent, the presence of ozone also prevents the destruction of the lift stations and treatment plant headworks due to microbial action.

SUMMARY

In summary, the continuous addition of the select microbe concentrate to the collection piping allows competitive exclusion to turn the entire collection system into an effective treatment step prior to the treatment plant. The select microbes not only reduce the hydrogen sulfide production, but also produce a minimum amount of respiratory gases as they reduce the BOD. In many applications, the reduction in BOD may be significant enough to offset the entire cost of the erosion and odor control technologies through the resultant reduction in sludge production. An increase in treatment plant capacity is also realized due to the reduced BOD loading and fresh microbe populations, resulting in greater overall plant efficiency.

Until the present invention, there has not been an affordable means of minimizing the formation of hydrogen sulfide within the collection systems. Prior to the present invention, every attempt at resolving the problems associated with hydrogen sulfide production have had a negative result for every positive result. Until a complete understanding of the mechanisms involved was realized, as demonstrated herein, success could not be achieved. Likewise, operating efficiency of wastewater treatments plants, due to the costs of dealing with high-BOD influent and high sludge production, has remained low until the advancements described herein.

The overall impact of the practice of the invention on the treatment plant is very significant. It is believed that the reduction in influent BOD could exceed 50% in most instances and may reach as much as 70 to 80% under some circumstances. This is especially true if there are long distances for the wastewater to travel to reach the treatment facility. The elimination of 50 percent or more of conventional sludge will result in large savings in equipment and operating costs. It is well known that the processing and disposal of sludge constitutes over half the operating cost of today's treatment plants. Furthermore, with increasing costs of conventional sludge processing and land disposal, alternative disposal methods such as incineration become economically feasible.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

I claim:

1. A method of treating wastewater prior to being processed within a wastewater treatment facility, wherein said wastewater is delivered to said wastewater treatment facility by a collection piping system having an interior surface, and wherein said wastewater includes a predominant waste material, said method comprising:

introducing select microbes into said piping system in an amount proportional to the surface area of said interior surface of said piping system, wherein said select microbes are capable of completely consuming said predominant waste material in said wastewater, until a biomass comprising almost entirely said select microbes is formed along said interior surface of said piping system;

monitoring the biological oxygen demand (BOD) level of said wastewater at a downstream location immediately prior to said wastewater treatment facility in comparison to a desired BOD level; and adjusting the introduction of said select microbes into said piping system in proportion to the average downstream flowrate of said wastewater through said piping system to minimize the difference between said monitored BOD level and said desired BOD level.

2. The method of claim 1, wherein said microbes are introduced in an initially non-active state.

3. The method of claim 1, wherein said microbes are non-pathenogenic.

4. The method of claim 1, wherein said microbes are capable of functioning in either an aerobic or an anaerobic manner.

5. The method of claim 1, wherein the level of nitrogen in said piping system is monitored, and wherein said introduction of said microbes is adjusted to maintain at least 0.1 mg/l of total nitrogen in said wastewater.

6. The method of claim 1, wherein a predetermined quantity of ozone is introduced into said piping system at selected locations.

7. The method of claim 1, wherein the introduction of said select microbes is accomplished by a microprocessor-controlled pump.

8. The method of claim 1, further comprising introducing select bacteria phages into said piping system, wherein said bacteria phages are capable of destroying predetermined bacteria which would otherwise impede the consumption of said predominant waste material by said select microbes.

9. The method of claim 8, wherein said bacteria phages are capable of destroying *e-coli* bacteria.

10. The method of claim 1, further comprising introducing select bacteria into said piping system, wherein said select bacteria are capable of consuming hydrogen sulfide present in said wastewater and converting said hydrogen sulfide to a stable and inactive state.

* * * * *